United States Patent
Hari et al.

(10) Patent No.: US 11,223,598 B2
(45) Date of Patent: Jan. 11, 2022

(54) INTERNET SECURITY

(71) Applicant: ALCATEL-LUCENT USA INC., Murray Hill, NJ (US)

(72) Inventors: Adiseshu Hari, Holmdel, NJ (US); Tirunell V. Lakshman, Morganville, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 244 days.

(21) Appl. No.: 15/145,460

(22) Filed: May 3, 2016

(65) Prior Publication Data

US 2017/0324738 A1    Nov. 9, 2017

(51) Int. Cl.
| | |
|---|---|
| *H04L 29/06* | (2006.01) |
| *H04L 29/08* | (2006.01) |
| *H04L 29/12* | (2006.01) |
| *H04W 12/106* | (2021.01) |
| *H04W 12/108* | (2021.01) |

(52) U.S. Cl.
CPC ...... *H04L 61/1511* (2013.01); *H04L 61/2007* (2013.01); *H04L 61/2061* (2013.01); *H04L 63/06* (2013.01); *H04L 63/08* (2013.01); *H04L 63/10* (2013.01); *H04L 67/02* (2013.01);
(Continued)

(58) Field of Classification Search
USPC ........................................................ 726/1–7
See application file for complete search history.

(56) References Cited

U.S. PATENT DOCUMENTS

| | | | |
|---|---|---|---|
| 2006/0182038 A1 | 8/2006 | Nalawade et al. | |
| 2006/0265508 A1* | 11/2006 | Angel ............... | H04L 29/12047 709/230 |

(Continued)

FOREIGN PATENT DOCUMENTS

CN    104580253 A    4/2015

OTHER PUBLICATIONS

A Survey of BGP Security Issues and Solutions Butler et al., Jan. 2010 (Year: 2010).*

(Continued)

*Primary Examiner* — Jahangir Kabir
(74) *Attorney, Agent, or Firm* — Tong, Rea, Bentley & Kim, LLC

(57) ABSTRACT

The present disclosure generally discloses an Internet security mechanism configured to provide security for Internet resources of the Internet using an Internet blockchain. The Internet blockchain may be configured to provide security for Internet resources of the Internet by supporting various types of verification related to Internet resources of the Internet, which may include verification of Internet resource ownership, verification of Internet resource transactions, and so forth. The Internet blockchain may be configured to enable Internet participants (e.g., Internet registries, Domain Name Service (DNS) entities, Autonomous Systems (ASes), or the like) to verify Internet resource ownership of Internet resources (e.g., Internet Protocol (IP) addresses, AS numbers, IP prefixes, DNS domain names, or the like) by Internet participants, to verify Internet resource transactions (e.g., allocation of IP addresses, allocation of AS numbers, advertisements of IP prefixes, allocation of DNS domain names, or the like) attempted by Internet participants, and so forth.

20 Claims, 10 Drawing Sheets

(52) U.S. Cl.
CPC ......... *H04L 67/104* (2013.01); *H04W 12/106* (2021.01); *H04W 12/108* (2021.01)

(56) References Cited

U.S. PATENT DOCUMENTS

| | | | |
|---|---|---|---|
| 2013/0074174 A1* | 3/2013 | Huang | H04L 45/04 726/12 |
| 2016/0098723 A1 | 4/2016 | Feeney | |
| 2017/0046792 A1* | 2/2017 | Haldenby | G06Q 20/0655 |
| 2017/0093712 A1* | 3/2017 | Chopra | H04L 29/08729 |
| 2017/0221052 A1 | 8/2017 | Sheng et al. | |
| 2017/0243025 A1* | 8/2017 | Kurian | G06F 21/6245 |
| 2018/0225466 A1* | 8/2018 | Ducatel | H04L 9/0637 |
| 2020/0177519 A1* | 6/2020 | Zou | H04L 9/3239 |

OTHER PUBLICATIONS

International Search Report and Written Opinion for corresponding application PCT/US2017/030490, dated Aug. 16, 2017—13 Pages.
Fromknecht et al., "A Decentralized Public Key Infrastructure with Identity Retention," International Association for Cryptologic Research, vol. 20141111:124302, pp. 1-16, Nov. 11, 2014.
Anonymous: "Coloredcoins—IssueAsset API Documentation—Version 0.2.0," URL:https://web.archive.org/web/20160330010821/http://coloredcoins.org/documentation/, XP055395988, 67 pages, Mar. 30, 2016. (Retrieved from the Internet on Aug. 3, 2017).
Kalodner et al., "An empirical study of Namecoin and lessons for decentralized namespace design," Workshop on the Economics of Information Security (WEIS), URL:https://pdfs.semanticscholar.org/5f2f/9118d34f741b714b47c4d153566ia77ebe19.pdf, XP055395664, 23 pages, Jun. 21, 2015. (Retrieved from the Internet on Aug. 3, 2017).
Vyshegorodtsev et al., "Reputation Scoring System Using an Economic Trust Model: A distributed approach to evaluate trusted third parties on the Internet," 2013 27th International Conference on Advanced Information Networking and Applications Workshops, XP055149051, pp. 730-737, Mar. 1, 2013.
Anonymous: "Colored Coins—Bitcoin Wiki," URL:https://en.bitcoin.it/wiki/Colored_Coins#Transaction_tags, XP055395892, 7 pages, Nov. 2, 2015. (Retrieved from the Internet on Aug. 3, 2017).
Wikipedia: "Bitcoin—Wikipedia," URL:https://en.wikipedia.org/w/index.pho?title=Bitcoin&oldid=888703576, XP055326918, 34 pages, Nov. 2, 2015. (Retrieved from the Internet on Dec. 7, 2016).
Nakamoto, Satoshi, "Bitcoin: A Peer-to-Peer Electronic Cash System," Nov. 2008, http://bitcoin.org/bitcoin.pdf, pp. 1-9.
EP Examination Report mailed in corresponding EP 17 733 637.7 dated Oct. 15, 2019, 7 pages.
EP Examination Report mailed in corresponding EP 17 733 637.7 dated May 14, 2020, 7 pages.
EP Examination Report mailed in corresponding EP 17 733 637.7 dated Feb. 4, 2021, 7 pages.
CN Examination Report mailed in corresponding CN 201780027400.0 dated Nov. 26, 2019, 7 pages.
CN Examination Report mailed in corresponding CN 201780027400.0 dated May 27, 2020, 6 pages.
CN Examination Report mailed in corresponding CN 201780027400.0 dated Sep. 30, 2020, 5 pages.
Meowbit.com, "Register, Configure, Renew, and Transfer .bit Domains," XP055688920, from URL: https://www.meowbit.com/how-to-register-dot-bit-domains/, retrieved on Mar. 2, 2021.
Narayanan, Arvind, et al., "Bitcoin and Cryptocurrency Technologies," XP055442367, retrieved from URL:https://lopp.net/pdf/princeton_bitcoin_book.pdf, Feb. 9, 2016.
Swan, "Blockchain:" Blueprint For a New Economy, XP055279098, published by O'Reilly Media, 2015.

* cited by examiner

FIG. 2
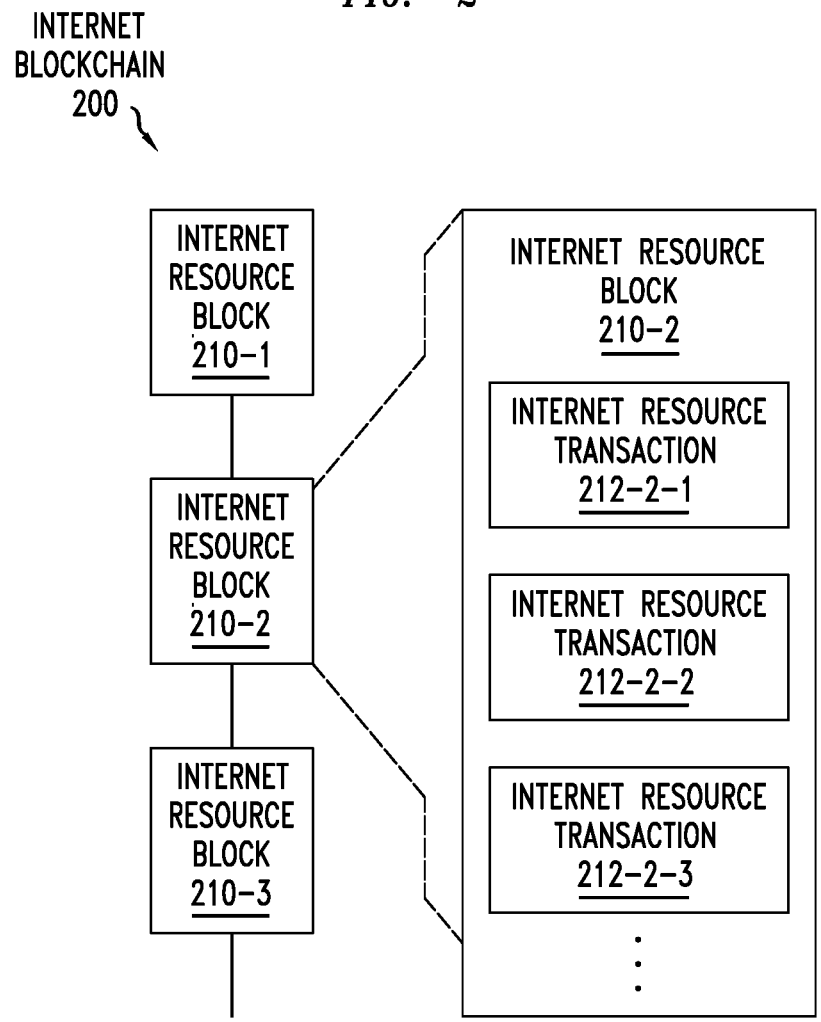
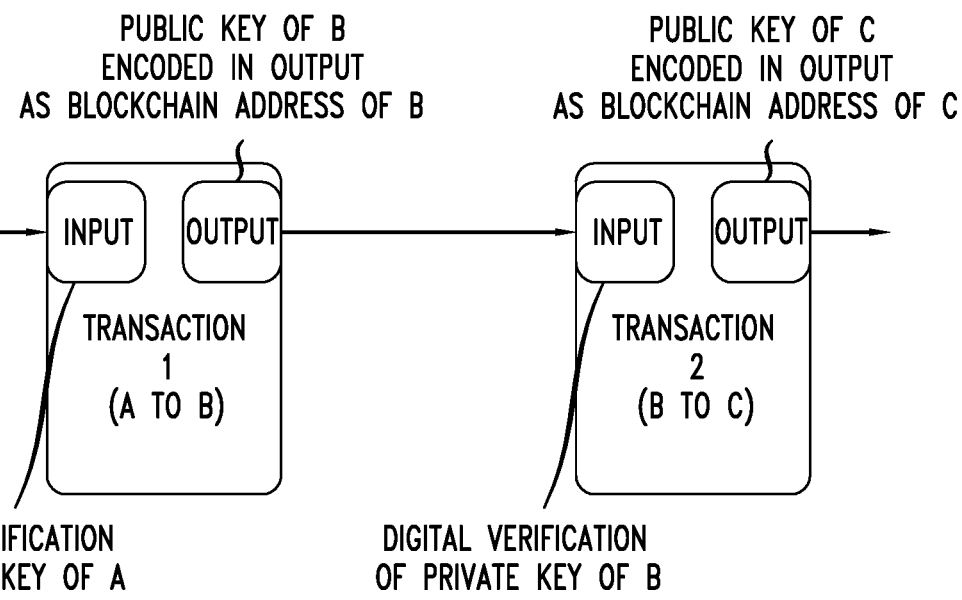

INTERNET SECURITY

TECHNICAL FIELD

The present disclosure relates generally to the field of communication networks and, more particularly but not exclusively, to securing resources of the Internet.

BACKGROUND

The Internet is an important part of the communications infrastructure of the world, rivaling physical infrastructure—such as roads, waterways, ports, and railways—in its importance to society. The Internet infrastructure, which includes various Internet resources such as Internet Protocol (IP) addresses and Domain Name Service (DNS) domain names, is designed to be administered via a set of cooperating Internet registries (IRs) and to operate amongst a set of cooperating Autonomous Systems (ASes). However, this assumption of cooperating IRs and ASes need to be re-examined in today's world of threats (e.g., advanced persistent threats, cyber terrorism, cyber warfare, and so forth) in which the ASes, and even the IRs themselves, might be compromised. For example, various IRs and ASes can potentially be breached, which may lead to problems such as compromised Border Gateway Protocol (BGP) routing and DNS resolution. Unlike certain types of attacks, such as password hacks or software backdoor attacks, which cripple individual organizations, attacks on the core Internet infrastructure, such as the BGP core Internet routing protocol and the DNS, can cut off various entities or locations (e.g., countries or even continents) from the Internet or even bring the entire Internet to a standstill. While certain Public Key Infrastructure (PKI) mechanisms may be used for Internet security, PKI mechanisms may become vulnerable if the root of trust is compromised. Furthermore, other aspects of Internet administration and operation cannot be secured by such PKI mechanisms.

SUMMARY

The present disclosure generally discloses an Internet security mechanism.

In at least some embodiments, an apparatus includes a processor and a memory communicatively connected to the processor. The processor is configured to generate an Internet resource transaction for an Internet resource. The Internet resource transaction indicates an allocation of the Internet resource from a first Internet participant to a second Internet participant. The processor is configured to broadcast the Internet resource transaction via a peer-to-peer system. The processor is configured to receive, via the peer-to-peer system, an Internet resource block including the Internet resource transaction. The processor is configured to associate the Internet resource block with an Internet blockchain.

In at least some embodiments, a method is provided. The method includes generating an Internet resource transaction for an Internet resource. The Internet resource transaction indicates an allocation of the Internet resource from a first Internet participant to a second Internet participant. The method includes broadcasting the Internet resource transaction via a peer-to-peer system. The method includes receiving, via the peer-to-peer system, an Internet resource block including the Internet resource transaction. The method includes associating the Internet resource block with an Internet blockchain.

In at least some embodiments, an apparatus includes a processor and a memory communicatively connected to the processor. The processor is configured to receive, via a peer-to-peer system, an Internet resource transaction for an Internet resource. The Internet resource transaction indicates an allocation of the Internet resource from a first Internet participant to a second Internet participant. The processor is configured to verify the Internet resource transaction for the Internet resource. The processor is configured to add the Internet resource transaction to an Internet resource block based on verification of the Internet resource transaction for the Internet resource. The processor is configured to broadcast the Internet resource block via the peer-to-peer system.

In at least some embodiments, a method is provided. The method includes receiving, via a peer-to-peer system, an Internet resource transaction for an Internet resource. The Internet resource transaction indicates an allocation of the Internet resource from a first Internet participant to a second Internet participant. The method includes verifying the Internet resource transaction for the Internet resource. The method includes adding the Internet resource transaction to an Internet resource block based on verification of the Internet resource transaction for the Internet resource. The method includes broadcasting the Internet resource block via the peer-to-peer system.

BRIEF DESCRIPTION OF THE DRAWINGS

The teachings herein can be readily understood by considering the following detailed description in conjunction with the accompanying drawings, in which:

FIG. 2 depicts an exemplary Internet blockchain including Internet resource blocks that include Internet resource transactions;

To facilitate understanding, identical reference numerals have been used, where possible, to designate identical elements that are common to the figures.

DETAILED DESCRIPTION

The present disclosure generally discloses an Internet security mechanism configured to provide security for Internet resources of the Internet. The Internet security mechanism may be configured to provide security for Internet resources of the Internet by supporting various types of verification related to Internet resources of the Internet, which may include verification of Internet resource ownership, verification of Internet resource transactions, or the like, as well as various combinations thereof. The Internet security mechanism may be configured to enable Internet participants (e.g., Internet registries, Domain Name Service (DNS) entities, Autonomous Systems (ASes), or the like) to verify Internet resource ownership of Internet resources (e.g., Internet Protocol (IP) addresses, AS numbers, IP prefixes, DNS domain names, or the like) by Internet participants, enable Internet participants to verify Internet resource transactions (e.g., allocation of IP addresses, allocation of AS numbers, advertisements of IP prefixes, allocation of DNS domain names, or the like) attempted by Internet participants, or the like, as well as various combinations thereof. The Internet security mechanism may be configured to provide security for Internet resources of the Internet using an Internet blockchain. The Internet security mechanism may be a distributed and peer-to-peer mechanism which is outside of the control of any single Internet participant or small group of Internet participants (e.g., Internet registries, DNS entities, ASes, or other centralized control organizations or entities), thereby providing a high level of security for Internet resources of the Internet and associated Internet resource transactions for the Internet resources. The Internet security mechanism is configured to address fundamental problems of Internet resource validity and Internet resource transaction validity in a manner that does not rely on any root of trust. These and various other embodiments and potential advantages of the Internet security mechanism may be further understood by considering the exemplary Internet system of FIG. 1.

Figure 1:
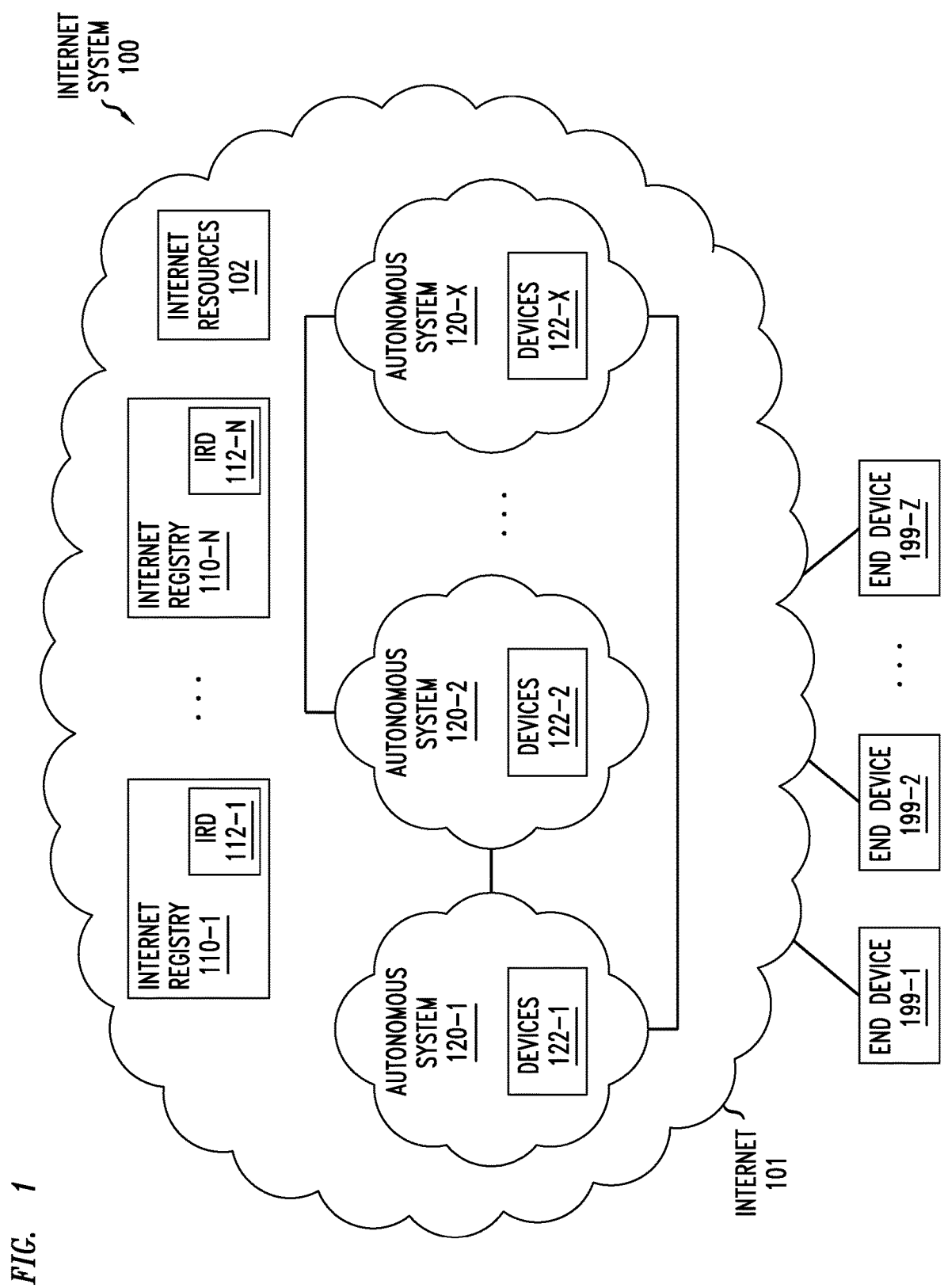
FIG. 1 depicts an exemplary Internet system including the Internet and end devices configured to communicate via the Internet.

FIG. 1 depicts an exemplary Internet system including the Internet and end devices configured to communicate via the Internet.

The Internet system 100 includes the Internet 101 and a set of end devices 199-1-199-Z (collectively, end devices 199) which are configured to communicate via the Internet 101.

The Internet 101 will generally be understood by one skilled in the art, although certain aspects are discussed herein for purposes of completeness and, further, based on relevance to the use of an Internet blockchain to provide security for Internet resources of the Internet 101.

The Internet 101 is a global system of interconnected computer networks that uses various types of communications resources (e.g., network elements, communication links, protocols, or the like) to connect billions of devices (e.g., end devices 199) worldwide.

The Internet 101 is configured to operate based on two principal namespaces, which include the Internet Protocol (IP) address spaces and the domain name hierarchy. The administration of the IP address spaces and the domain name hierarchy is performed by a hierarchically arranged group of organizations that includes various Internet registries (IRs). The Internet Corporation for Assigned Names and Numbers (ICANN) is a non-profit organization that is responsible for coordinating the methodologies and maintenance of the IP address spaces and the domain name hierarchy. For example, ICANN manages numbering facilities, such as IP address spaces for IPV4 and IPv6, allocation of IP address blocks to regional Internet registries, allocation of Autonomous System (AS) numbers, and so forth. Similarly, for example, ICANN also manages naming facilities, such as introduction of top-level domains, operation of root name servers, and so forth. The Internet Assigned Numbers Authority (IANA) is a department of ICANN that oversees global IP address allocation, AS number allocation, aspects of the domain name hierarchy, and so forth. The IANA manages the allocation and registration of Internet number resources (e.g., IP addresses, AS numbers, and so forth) globally. The IANA allocates Internet resources to regional Internet registries (RIRs) which, in turn, allocate Internet resources to customers (e.g., countries, Internet Service Providers (ISP), enterprises, corporations, or the like) based on regional policies, respectively. The RIRs include the following five registries responsible for Internet resource allocation in various parts of the world: (1) American Registry for Internet Numbers (ARIN) for the United States, Canada, several parts of the Caribbean region, and Antarctica, (2) Réseaux IP Européens Network Coordination Centre (RIPE NCC) for Europe, Russia, the Middle East, and Central Asia, (3) Asia-Pacific Network Information Centre (APNIC) for Asia, Australia, New Zealand, and neighboring countries, (4) African Network Information Center (AFRINIC) for Africa, and (5) Latin America and Caribbean Network Information Centre (LACNIC) for Latin America and parts of the Caribbean region. The customers of the RIRs may allocate Internet resources locally (e.g., country-operated IRs may allocate Internet resources within their respective countries (e.g., to ISPs, enterprises, corporations, end-user organizations, or the like), ISPs may allocate Internet resources to enterprises, corporations, end-users, or the like), enterprises may allocate Internet resources within their respective enterprises, and so forth). The Internet registries discussed herein are represented in FIG. 1 as Internet registries (IRs) 110-1-110-N (collectively, IRs 110) having IR devices (IRDs) 112-1-112-N (collectively, IRDs 112) associated therewith, respectively. It will be appreciated that, although omitted from FIG. 1 for purposes of clarity, the IRs 110 generally are arranged hierarchically.

The Internet 101 is composed of interconnected autonomous systems (ASes) 120-1-120-X (collectively, ASes 120). In general, an AS 120 is a communication network which may be interconnected to one or more other ASes 120. More specifically, an AS 120 is a collection of connected IP routing prefixes under the control of one or more network operators on behalf of an administrative entity that presents a common and clearly defined routing policy to the Internet 101. For example, ASes 120 may include networks of governments, ISPs, enterprises, corporations, organizations, or the like. The ASes 120 each include various communication network resources (e.g., network elements, communication links, and so forth), which have been omitted from FIG. 1 for purposes of clarity. The ASes 120 each have various Internet resources allocated thereto. For example, each AS 120 has a unique AS number allocated thereto by an Internet registry and, further, each AS 120 may have one or more sets of IP addresses (which may be denoted using IP address ranges, IP prefixes, or the like) allocated thereto by one or more Internet registries. For example, each AS 120 may have one or more DNS domain names allocated thereto. It will be appreciated that, although omitted from FIG. 1 for purposes of clarity, the ASes 120 may be arranged in various arrangements with respect to each other. It will be appreciated that information (e.g., routing information or the like) may be advertised within each of the ASes 120 using one or more Interior Gateway Protocols (IGPs), such as Open Shortest Path First (OSPF), Routing Information Protocol (RIP), and Intermediate System to Intermediate System (IS-IS). It will be appreciated that information (e.g., IP prefixes or the like) may be advertised between the ASes 120 using one or more Exterior Gateway Protocols (EGPs), such the Border Gateway Protocol (BGP). It will be appreciated that the ASes 120 include various types of devices (which may include traffic handling devices, control devices, or the like, and which also may include devices related to allocation and use of Internet resources), which are represented in FIG. 1 as sets of devices 122-1-122-X associated with the ASes 120-1-120-N, respectively. The typical configuration and operation of ASes 120 within the Internet 101 will be understood by one skilled in the art.

The Internet 101 is configured to support a Domain Name Service (DNS), including allocation of DNS domains, allocation of DNS domain names, handling of DNS domain name to IP address mappings, and so forth. In general, the DNS is a decentralized naming system for computers, services, or any resource connected to a communication network (e.g., the Internet or a private network). The DNS associates various information with domain names assigned to each of the participating entities. For example, the DNS translates more readily memorized domain names to the numerical IP addresses used for the purpose of locating and identifying computer services and devices with the underlying network protocols. The DNS delegates the responsibility of assigning domain names and mapping those domain names to Internet resources by designating authoritative name servers for each domain where network administrators may delegate authority over sub-domains of their allocated name space to other name servers, thereby providing a distributed and fault tolerant service. The DNS, by providing a worldwide, distributed directory service for Internet domains, is an important component of the functionality of the Internet. It will be appreciated that the DNS may be supported by and used by various types of devices, including various types of devices depicted in FIG. 1 (e.g., IRDs 112 which may be configured to support allocation of domain names and to provide DNS related information, devices 122 of ASes 120 (e.g., DNS servers and so forth), end devices 199 (which may use domain names, initiate domain name to IP address lookups, and so forth), or the like. The typical operation of the DNS within the Internet 101 will be understood by one skilled in the art.

The Internet 101, as discussed above, supports and relies upon various types of Internet resources and associated Internet resource transactions. The Internet resources are depicted in FIG. 1, for purposes of completeness, as Internet resources 102. For example, the Internet resources 102 may include IP addresses, AS numbers, IP prefixes, DNS domain names, or the like. For example, the Internet resource transactions for the Internet resources 102 may include various types of transactions, such as allocations of IP addresses, allocations of AS numbers, advertisements of IP prefixes, allocations of DNS domain names, or the like. It will be appreciated that the Internet 101 may rely on other types of Internet resources 102 and associated Internet resource transactions for the Internet resources 102.

The end devices 199 may include any types of devices which may communicate via Internet 101. The end devices 199 may communicate via Internet 101 using various types of Internet resources discussed above (e.g., IP addresses, domain names, and so forth). For example, the end device 199 may include telephones, cellular phones, smartphones, desktop computers, laptop computers, tablet computers, customer premises gateway devices, routers, smart devices (e.g., televisions, appliances, or the like), gaming systems, Internet-of-Things (IoT) devices, Machine-to-Machine (M2M) communication devices, or the like.

The Internet system 100 is configured to support an Internet security mechanism for securing the Internet resources 102 of the Internet 101.

The Internet security mechanism may secure the Internet resources 102 of the Internet 101 using an Internet blockchain. The Internet blockchain is a chain, or sequence, of Internet resource blocks configured to maintain Internet resource transactions associated with Internet resources 102 of the Internet 101. In general, an Internet resource block of the Internet blockchain may include one or more Internet resource transactions. In general, an Internet resource transaction of the Internet blockchain may be a transaction for one or more Internet resources 102. In general, an Internet resource transaction of the Internet blockchain may be a transaction for transferring ownership or control of one or more Internet resources 102 from one or more source Internet participants to one or more recipient Internet participants. In general, an Internet resource transaction of the Internet blockchain may include one or more transaction inputs and one or more transaction outputs. In general, for an Internet resource transaction, a transaction input of the Internet resource transaction references a transaction output of a previous Internet resource transaction and a transaction output of the Internet resource transaction references an identifier of the recipient Internet participant of the Internet resource of the Internet resource transaction. Accordingly, in general, the Internet blockchain may record Internet resource transactions for Internet resources 102 (e.g., IP address allocations, AS number allocations, IP prefix advertisements, DNS domain name allocations, and so forth), thereby enabling Internet participants to verify core Internet resource ownership, transactions, and usage.

The Internet blockchain may be managed by Internet participant devices associated with Internet participants of Internet 101. The Internet participant devices may be configured to operate in various roles depending on the functions being performed by the Internet participant devices within the context of securing Internet resources 102 of the Internet 101 using the Internet blockchain. In general, each of the Internet participant devices may be configured to operate as a peer and, thus, the Internet blockchain may be managed using a peer-to-peer system or network that includes the various Internet participant devices as peers. The peers have unique peer addresses associated therewith, respectively, for operating within the peer-to-peer system (e.g., for sending messages, receiving messages, or the like). For example, the peer addresses of the peers may be the IP addresses of the Internet participant devices or any other suitable identifiers suitable for use as peer addresses of the peers. The peers have one or more cryptographic keys associated therewith (e.g., a private key and a public key), respectively, for operating on the Internet blockchain (e.g., for use in signing and verifying Internet resource transactions for Internet resources 102). The peers have Internet blockchain addresses associated therewith, respectively, for operating on the Internet blockchain or at least being involved in Internet resource transactions using the Internet blockchain. The Internet blockchain addresses of the peers may be the public keys of the peers or may be shortened versions of the public keys of the peers (e.g., hashes of the public keys of the peers or other suitable shortened versions of the public keys of the peers). The peers may be configured to participate in Internet resource transactions involving Internet resources 102, create Internet resource transactions involving Internet resources 102, broadcast the created Internet resource transactions via the peer-to-peer system, receive Internet resource blocks including verified Internet resource transactions via the peer-to-peer system, add the received Internet resource blocks including the verified Internet resource transactions to the Internet blockchain, and so forth. In general, at least a portion of the Internet participant devices also may be configured to operate as miners for the Internet blockchain. The miners may operate within the peer-to-peer system using their associated peer addresses as each of the miners is also a peer within the peer-to-peer system. The miners may operate on the Internet blockchain using their associated Internet blockchain addresses (which are the Internet blockchain addresses of the peers, as discussed above). The miners may be configured to verify Internet resource transactions, periodically aggregate Internet resource transactions into Internet resource blocks and broadcast the Internet resource blocks via the peer-to-peer system, or the like. For example, the Internet participant devices (and, thus, the peers and miners) may include IRDs 112 of IRs 110, devices 122 of ASes 120, end devices 199, or the like, as well as various other devices which may manage and use the Internet blockchain. It will be appreciated that Internet participant devices may be configured to provide other functions within the peer role or miner role for securing Internet resource transactions of the Internet resources 102, operate in one or more other roles for providing various functions related to securing Internet resource transactions of the Internet resources 102, or the like, as well as various combinations thereof.

The Internet blockchain may be managed by Internet participant devices in a manner for securing Internet resources 102 which may be allocated from Internet participants to Internet participants using Internet resource transactions. In general, an Internet resource transaction involves an allocation of an Internet resource 102 from one or more Internet resource transaction inputs to one or more Internet resource transaction outputs. The Internet resource transaction inputs include pointers to the outputs of previous Internet resource transactions, while the Internet resource transaction outputs, in the simplest case, point to Internet blockchain addresses of peers of the Internet blockchain. In other words, an Internet resource transaction may serve to move Internet resources 102 from one or more Internet blockchain addresses (Internet participant devices and, thus, Internet participants) to one or more Internet blockchain addresses (Internet participant devices and, thus, Internet participants). It is noted that, once an Internet resource transaction output is referenced, it can no longer be referenced again, thereby preventing double allocations of Internet resources 102. The Internet resource transactions are broadcast by the peers to the peer-to-peer system such that the Internet resource transactions are available to the peers and miners of the peer-to-peer system. The Internet resource transactions are verified and periodically aggregated into Internet resource blocks by the miners. The miners periodically broadcast the Internet resource blocks back to the peer-to-peer system, where each of the peers collects the Internet resource blocks into a linear chain of Internet resource blocks called the Internet blockchain. As a result, an Internet resource transaction that has been created by an Internet participant in order to allocate an Internet resource 102 to one or more Internet participants will only be considered to be valid after it has entered the Internet blockchain. It will be appreciated that Internet resource transaction verification by peers and miners is relatively simple since each Internet resource transaction maintains pointers to previous Internet resource transactions and, as long as the previous Internet resource transaction(s) referenced by the current Internet resource transaction to be verified is part of an Internet resource block published by the miners that has been incorporated into the Internet blockchain and has not already been referenced, the current Internet resource transaction is considered to be valid. It will be appreciated that, since any peer may be a miner, and all Internet resource transactions can be verified by all peers, a compromised miner which puts out invalid Internet resource transactions (e.g., fake transactions, double transactions, or the like) will be detected by the peers immediately or nearly immediately. As a result, the Internet blockchain makes the Internet resistant, or at least more resistant, to compromised peers or miners, thereby enabling decentralized Internet resource transactions across untrusted peers in a secure manner.

The Internet blockchain may be managed by Internet participant devices, where management may include establishment of the Internet blockchain by various Internet participants, maintenance of the Internet blockchain by various Internet participants, use of the Internet blockchain by various Internet participants, and so forth. The establishment of the Internet blockchain may include an initial "genesis" bootstrap period in which the Internet resources 102 are initially transferred into the Internet blockchain in the form of one or more genesis Internet resource blocks where each genesis Internet resource block may include one or more genesis Internet resource transactions where the genesis Internet resource transactions record the assignment of the Internet resources 102 from the highest layer(s) of the hierarchy of Internet participants (e.g., one or more Internet registries or other entities) into the Internet blockchain to provide thereby an initial consistent state of the Internet resource assignments. It will be appreciated that, at this point, each Internet participant is free to publish new Internet resource transactions to the peer-to-peer system and, similarly, each Internet participant is free to mine Internet resource transactions into Internet resource blocks in the Internet blockchain. As discussed above, maintaining the Internet blockchain in this manner preserves the consistency of the Internet resources 102 over time, even if one or more of the Internet participants is compromised. The Internet blockchain may be used by Internet participants to verify Internet resource ownership and transactions (e.g., verify whether a particular Internet participant owns an IP address or an IP address range or prefix, verify whether a particular Internet participant owns an AS number, verify whether a particular AS is authorized to advertise an IP prefix in BGP (e.g., a Route Origin Authorization or a downstream advertisement), whether a particular Internet participant is authorized to allocate a DNS domain or domain name, or the like). An exemplary Internet blockchain is presented with respect to FIG. 2 and, further, the genesis Internet resource transactions and associated subsequent Internet resource transactions for various Internet resources 102 are presented with respect to FIGS. 3A and 3B (for IP address allocations), FIG. 4 (for AS number allocations), FIGS. 5A and 5B (for IP prefix advertisements), and FIGS. 6A and 6B (for domain name allocations).

FIG. 2 depicts an exemplary Internet blockchain including Internet resource blocks that include Internet resource transactions.

The Internet blockchain 200, as discussed above, includes a serial chain of Internet resource blocks 210-1, 210-2, 210-3, and so forth (collectively, Internet resource blocks 210). The Internet blockchain 200 may be maintained by each of the peers (e.g., Internet participant devices) associated with the peer-to-peer system for the Internet blockchain 200, with each peer appending new Internet resource blocks 210 to the Internet blockchain 200 as the new Internet resource blocks 210 are broadcast by miners of the peer-to-peer system.

The Internet resource blocks 210 each include one or more Internet resource transactions 212 (illustratively, Internet resource block 210-1 includes one or more Internet resource transactions 212-1, Internet resource block 210-2 includes one or more Internet resource transactions 212-2, Internet resource block 210-3 includes one or more Internet resource transactions 212-3, and so forth).

The Internet resource transactions 212 each include one or more transaction inputs and one or more transactions outputs. For a given Internet resource transaction 212, the one or more transaction inputs may identify one or more Internet participants from which the Internet resource(s) of the Internet resource transaction 212 is being allocated and the one or more transaction outputs may identify one or more Internet participants to which the Internet resource(s) of the Internet resource transaction 212 is being allocated. The transaction input of a given Internet resource transaction 212 for an Internet resource references a previous transaction output of a previous Internet resource transaction for the Internet resource and, thus, references a previous Internet blockchain address of the Internet participant to which the Internet resource was transferred in the previous Internet resource transaction (which is the source Internet participant of the Internet resource transaction 212). The transaction input of a given Internet resource transaction 212 for an Internet resource, in addition to referencing a previous transaction output of a previous Internet resource transaction for the Internet resource and its associated previous Internet blockchain address, also provides verification of ownership of that previous Internet blockchain address by signing the transaction input using the private key corresponding to that previous Internet blockchain address (e.g., the source Internet participant to the Internet resource transaction 212 verifies ownership of the Internet blockchain address of the previous transaction output of the previous Internet resource transaction and, thus, verifies that it has ownership of or authority for the Internet resource being transferred in the Internet resource transaction 212). The transaction output of a given Internet resource transaction 212 for an Internet resource may include a public key of the recipient Internet participant (or a shortened version of the public key, such as a hash of the public key, or the recipient Internet participant) to which the Internet resource(s) of the Internet resource transaction 212 is being allocated (which, as discussed herein, may be the Internet blockchain address of the recipient Internet participant). In other words, the transaction input both references and verifies an Internet blockchain address of the source Internet participant and the transaction output references the Internet blockchain address of the recipient Internet participant. For a given Internet resource transaction 212, the Internet resource transaction 212 may include various other types of information describing the Internet resource transaction (e.g., an indication or identification of the Internet resource being allocated, an indication or identification of the Internet resource type being allocated, an indication or identification of the quantity of Internet resource being allocated, or the like, as well as various combinations thereof).

The Internet resource transactions 212 may be further understood by considering the exemplary sequence of Internet resource transactions depicted in FIG. 2, which further illustrates the manner in which related Internet resource transactions 212, related by allocation of Internet resources between Internet participants, are signed and verified by the Internet participants to secure the Internet resource transactions 212 and, therefore, the Internet resources of the Internet resource transactions 212. The exemplary sequence of Internet resource transactions includes a first Internet resource transaction from Internet participant A to Internet participant B and a second Internet resource transaction from Internet participant B to Internet participant C. The first Internet resource transaction from Internet participant A to Internet participant B, which is created by Internet participant A, includes a transaction input referencing the Internet blockchain address of Internet participant A and verifying the Internet blockchain address of Internet participant A (e.g., including a digital verification of the private key of Internet participant A to prove that A is authorized to transfer the Internet resource, such as a digital signature based on the private key of Internet participant B) and a transaction output referencing the Internet blockchain address of Internet participant B to which the Internet resource is being allocated (e.g., including a public key of Internet participant B or a shortened version of the public key of Internet participant B). The transaction input of the first Internet resource transaction includes a pointer to the transaction output of a previous Internet resource transaction (not depicted) which allocated that Internet resource to Internet participant A. The second Internet resource transaction from Internet participant B to Internet participant C, which is created by Internet participant B, includes a transaction input referencing the Internet blockchain address of Internet participant A and verifying the Internet blockchain address of Internet participant A (e.g., including a digital verification of the private key of Internet participant B to prove that B is authorized to transfer the Internet resource, such as a digital signature based on the private key of Internet participant B) and a transaction output referencing the Internet blockchain address of Internet participant C to which the Internet resource is being allocated (e.g., including a public key of Internet participant C or a shortened version of the public key of Internet participant C). The transaction input of the second Internet resource transaction includes a pointer to the transaction output of the first Internet resource transaction which allocated that Internet resource to Internet participant B. It will be appreciated that this linking of the transaction input of the second Internet resource transaction to the transaction output of the first Internet resource transaction enabled miners to evaluate the second Internet resource transaction, based on the first Internet resource transaction, in order to determine that the second Internet resource transaction is valid and, thus, enable inclusion of the second Internet resource transaction in the Internet blockchain 200.

Figure 3A:
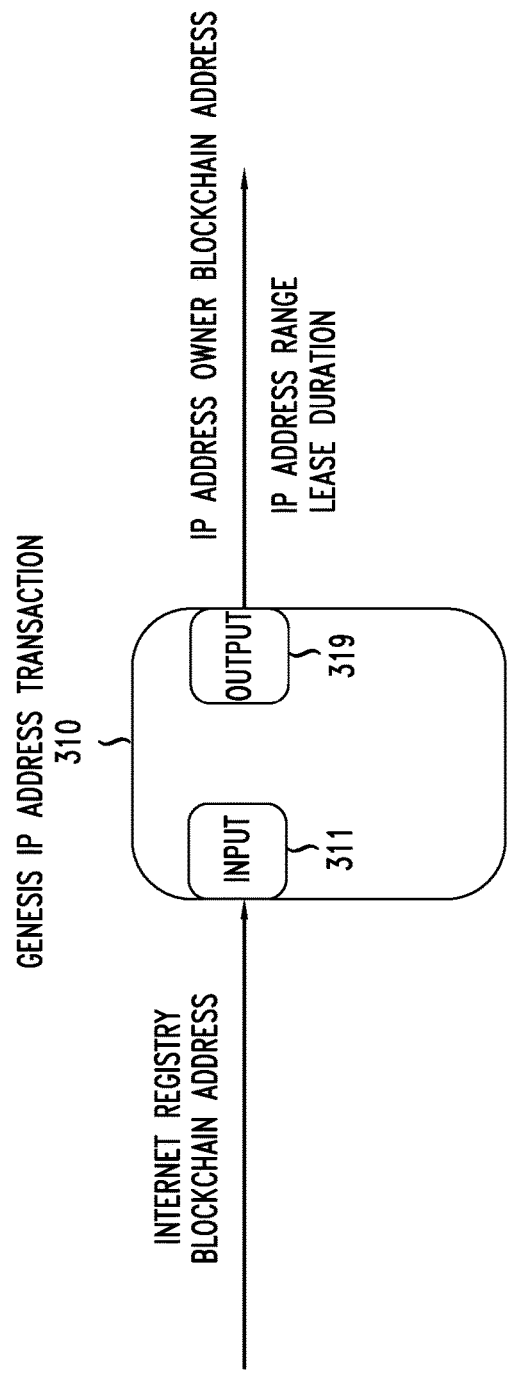
FIGS. 3A and 3B depict exemplary Internet resource transactions for IP addresses.
Figure 3B:
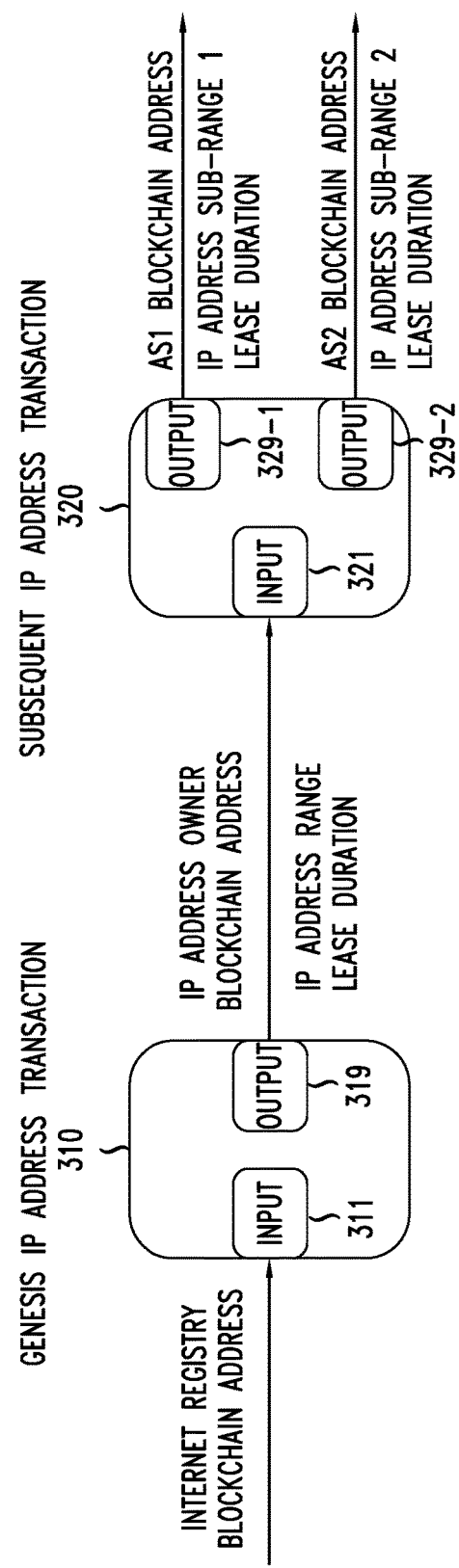

FIGS. 3A and 3B depict exemplary Internet resource transactions for IP addresses.

FIG. 3A depicts a genesis IP address transaction 310 for a range of IP addresses in which the range of IP addresses is allocated by an Internet registry to an IP address owner. As depicted in FIG. 3A, the genesis IP address transaction 310 includes (1) an input 311 identifying the Internet registry by its Internet blockchain address and (2) an output 319 identifying IP address owner by its Internet blockchain address and also including details of the IP address allocation (illustratively, the range of IP addresses being allocated by the Internet registry to the IP address owner, the lease duration for the allocation of the range of IP addresses to the IP address owner, or the like). The genesis IP address transaction 310 provides a finite duration lease of the range of IP addresses from the Internet registry to the IP address owner. It will be appreciated that less or more information may be included in the details of the IP address allocation.

FIG. 3B depicts the genesis IP address transaction 310 of FIG. 3A as well as a subsequent IP address transaction 320 for the range of IP addresses allocated to the IP address owner in the genesis IP address transaction 310. As depicted in FIG. 3B, the IP address owner which receives the allocation of the IP addresses in the genesis IP address transaction 310 of FIG. 3A may then further allocate the IP addresses to ASes (illustratively, AS1 and AS2). More specifically, as depicted in FIG. 3B, the subsequent IP address transaction 320 includes (1) an input 321 identifying the IP address owner by its Internet blockchain address (i.e., referencing the output 319 of the genesis IP address transaction 310) and (2a) a first output 329-1 identifying AS1 by its Internet blockchain address and also including details of the IP address allocation (illustratively, the first sub-range of IP addresses being allocated by the IP address owner to AS1, the lease duration for the allocation of the first sub-range of IP addresses to AS1, or the like) and (2b) a second output 329-2 identifying AS2 by its Internet blockchain address and also including details of the IP address allocation (illustratively, the second sub-range of IP addresses being allocated by the IP address owner to AS2, the lease duration for the allocation of the first sub-range of IP addresses to AS2, or the like). The subsequent IP address transaction 320 provides a finite duration lease of the range of IP addresses from the IP address owner to AS1. It will be appreciated that less or more information may be included in the details of each of the two IP address allocations.

It is noted that the IP address transactions of FIGS. 3A and 3B, as well as other IP address transactions that become part of the Internet blockchain, enable various Internet participants to accurately and reliably map IP address ownership, including verifying whether a particular Internet participant owns a given IP address. For example, if IP address range [192.0.2.1-192.0.2.14] has been previously assigned to Internet blockchain address A by a registry with Internet blockchain address B, an attempt to create a new Internet resource transaction to assign this IP address range to Internet blockchain address C will fail by any entity/device other than Internet blockchain address A.

Figure 4:
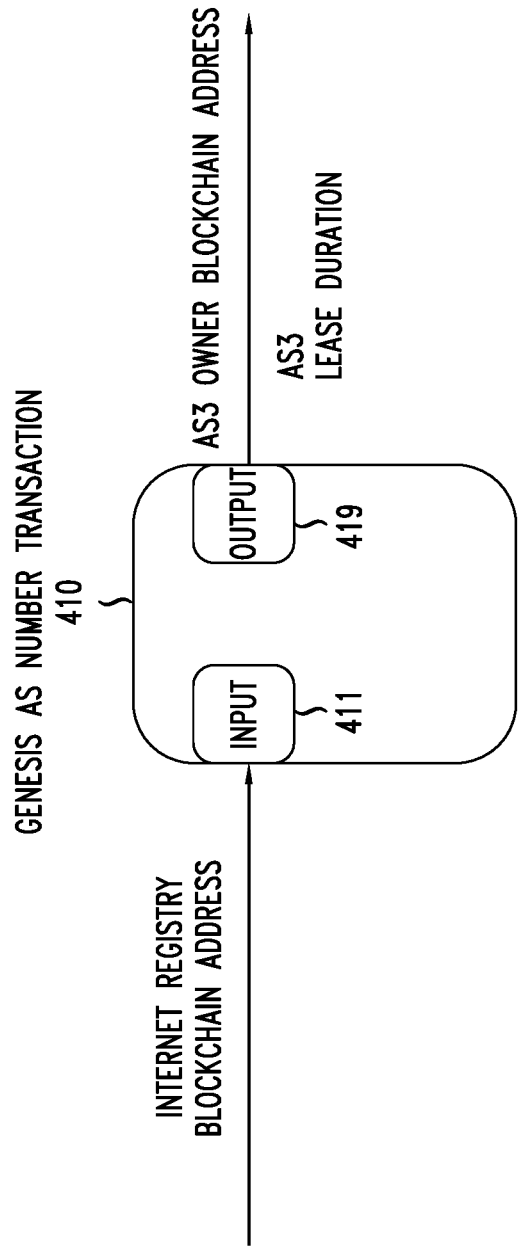
FIG. 4 depicts an exemplary Internet resource transactions for AS numbers.

FIG. 4 depicts an exemplary Internet resource transaction for AS numbers. More specifically, FIG. 4 depicts a genesis AS number transaction 410 for an AS number in which the AS number is allocated by an Internet registry to an AS owner (illustratively, AS3). As depicted in FIG. 4, the genesis AS number transaction 410 includes (1) an input 411 identifying the Internet registry by its Internet blockchain address and (2) an output 419 identifying AS3 by its Internet blockchain address and also including details of the AS number allocation (illustratively, AS number being allocated by the Internet registry to AS3, the lease duration for the allocation of the AS number to AS3, or the like). The genesis AS number transaction 410 enables AS3 to use the AS number assigned to AS3. It will be appreciated that less or more information may be included in the details of the AS number allocation.

It is noted that the genesis AS number transaction of FIG. 4, as well as other AS number transactions that become part of the Internet blockchain, enable various Internet participants to accurately and reliably map AS number ownership, including verifying whether a particular Internet participant owns a given AS number. For example, if AS number 32279 has been previously assigned to an AS with Internet blockchain address A by a registry with Internet blockchain address B, an attempt to create a new Internet resource transaction to assign this AS number to Internet blockchain address C will fail by any entity/device other than Internet blockchain address A.

Figure 5A:
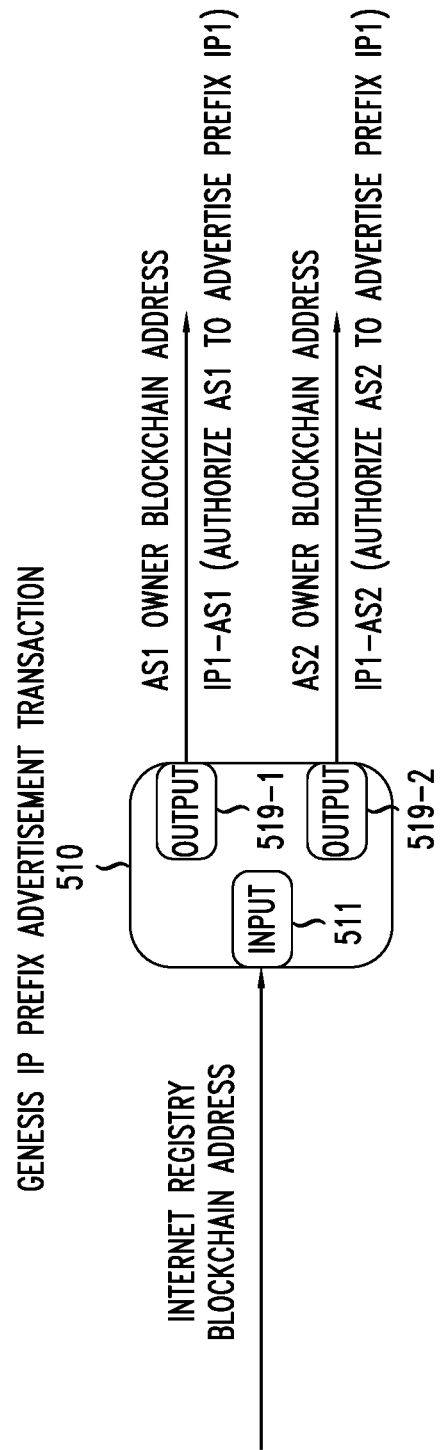
FIGS. 5A and 5B depict exemplary Internet resource transactions for IP prefixes.
Figure 5B:
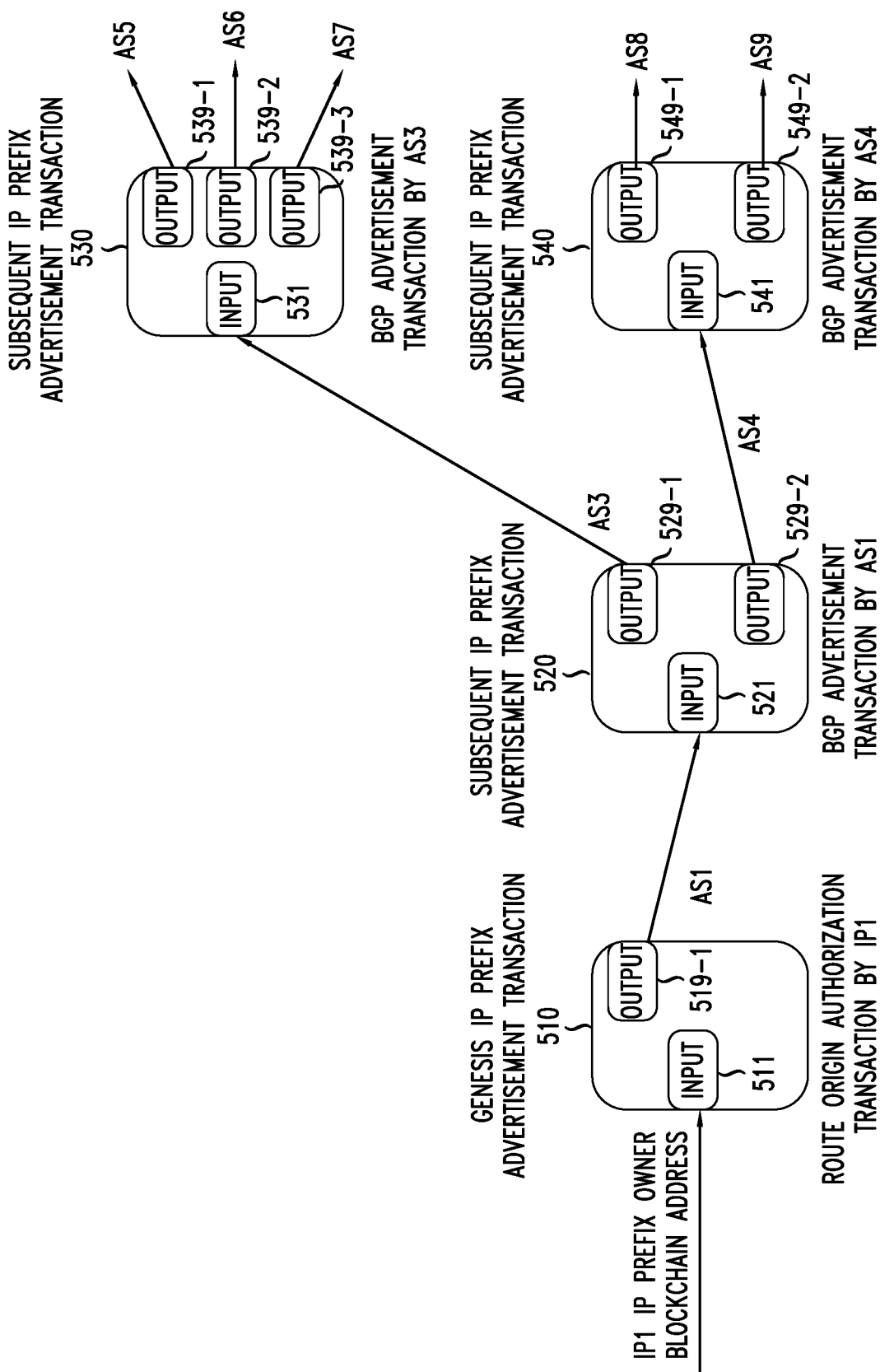

FIGS. 5A and 5B depict exemplary Internet resource transactions for IP prefixes.

FIG. 5A depicts a genesis IP prefix advertisement transaction 510 for an IP prefix in which an IP prefix owner authorized advertisement of an IP prefix (denoted as IP1) by two different ASes (illustratively, AS1 and AS2). This initial authorization of advertisement of an IP prefix is typically referred to as a Route Origin Authorization (ROA). As depicted in FIG. 5A, the genesis IP prefix advertisement transaction 510 includes (1) an input 511 identifying the IP prefix owner of IP1 by its Internet blockchain address and (2a) a first output 519-1 identifying AS1 by its Internet blockchain address and also including an indication that AS1 is authorized by the IP prefix owner IP1 to advertise the IP prefix IP1 and (2b) a second output 519-2 identifying AS2 by its Internet blockchain address and also including an indication that AS2 is authorized by the IP prefix owner IP1 to advertise the IP prefix IP1. It will be appreciated that additional information may be included in the details of the genesis IP prefix advertisement transaction 510.

FIG. 5B depicts the genesis IP prefix advertisement transaction 510 of FIG. 5A as well as subsequent IP prefix advertisement transactions (illustratively, subsequent IP prefix advertisement transactions 520, 530, and 540) for the IP prefix IP1 for which the IP prefix advertisement authorization was given in the genesis IP prefix advertisement transaction 510.

As depicted in FIG. 5B, AS1 which received authorization to advertise the IP prefix IP1 in the genesis IP prefix advertisement transaction 510 of FIG. 5A may then further authorize advertisement of the IP prefix IP1 to additional ASes (illustratively, AS3 and AS4). More specifically, as depicted in FIG. 5B, the subsequent IP prefix advertisement transaction 520 includes (1) an input 521 identifying AS1 by its Internet blockchain address (i.e., referencing the output 519 of the genesis IP prefix advertisement transaction 510) and (2a) a first output 529-1 identifying AS3 by its Internet blockchain address and also including an indication that AS3 is authorized by AS1 to advertise the IP prefix IP1 and (2b) a second output 529-2 identifying AS4 by its Internet blockchain address and also including an indication that AS4 is authorized by AS1 to advertise the IP prefix IP1.

As depicted in FIG. 5B, AS3 which received authorization to advertise the IP prefix IP1 in the subsequent IP prefix advertisement transaction 520 of FIG. 5B may then further authorize advertisement of the IP prefix IP1 to additional ASes (illustratively, AS5, AS6, and AS7). More specifically, as depicted in FIG. 5B, the subsequent IP prefix advertisement transaction 530 includes (1) an input 531 identifying AS3 by its Internet blockchain address (i.e., referencing the output 529-1 of the subsequent IP prefix advertisement transaction 520) and (2a) a first output 539-1 identifying AS5 by its Internet blockchain address and also including an indication that AS5 is authorized by AS3 to advertise the IP prefix IP1, (2b) a second output 539-2 identifying AS6 by its Internet blockchain address and also including an indication that AS6 is authorized by AS3 to advertise the IP prefix IP1, and (2c) a third output 539-3 identifying AS7 by its Internet blockchain address and also including an indication that AS7 is authorized by AS3 to advertise the IP prefix IP1.

As depicted in FIG. 5B, AS4 which received authorization to advertise the IP prefix IP1 in the subsequent IP prefix advertisement transaction 520 of FIG. 5B may then further authorize advertisement of the IP prefix IP1 to additional ASes (illustratively, AS8 and AS9). More specifically, as depicted in FIG. 5B, the subsequent IP prefix advertisement transaction 540 includes (1) an input 541 identifying AS4 by its Internet blockchain address (i.e., referencing the output 529-2 of the subsequent IP prefix advertisement transaction 520) and (2a) a first output 549-1 identifying AS8 by its Internet blockchain address and also including an indication that AS8 is authorized by AS4 to advertise the IP prefix IP1 and (2b) a second output 549-2 identifying AS9 by its Internet blockchain address and also including an indication that AS9 is authorized by AS4 to advertise the IP prefix IP1.

It will be appreciated that additional information may be included in the details of the subsequent IP prefix advertisement transactions 520, 530, and 540.

It is noted that the IP prefix advertisement transactions of FIGS. 5A and 5B, as well as other IP prefix advertisement transactions that become part of the Internet blockchain, enable various Internet participants to accurately and reliably determine authority to advertise IP prefixes, including verifying whether a particular AS is authorized to advertise a particular prefix in BGP. For example, IP prefix advertisement transactions may be used to present false downstream BGP advertisements of IP prefixes. For example, if an AS X advertises that is directly connected to IP prefix Y, then the Internet blockchain indicates the true owner of IP prefix Y and whether the owner of IP prefix Y had authorized AS X to advertise IP prefix Y. This prevents IP hijacking and false BGP advertisements at the origin; however, this may not solve the case of false BGP advertisements further downstream (e.g., where a BGP speaker might be 5 AS hops away from an IP prefix, but might advertise a 2-hop AS path to the IP prefix). The IP prefix advertisement transactions may be used to prevent such false downstream BGP advertisements by recording, in the Internet blockchain, BGP advertisements by BGP speakers of the Internet. For example, each time a BGP speaker advertises an AS-Path in a BGP Update message, it may also create a corresponding IP prefix advertisement transaction (which also may be referred to as a BGP advertisement transaction) and publish the IP prefix advertisement transaction the Internet blockchain peer-to-peer system for verification and inclusion in the Internet blockchain after the IP prefix advertisement transaction is verified. As indicated with respect to FIGS. 5A and 5B, each IP prefix advertisement transaction references (in its input) its previous upstream AS from which it originally received the BGP update and also references (in its output(s)) its downstream AS(es) to which it is sending the BGP Update message(s) referencing the AS path. For example, assuming that AS1 initially advertised IP Prefix A to AS2 and AS3, AS1 will create a BGP advertisement transaction listing IP prefix A as its inputs, and AS2 and AS3 as its outputs and other Internet participants can verify from the Internet blockchain that AS1 is allowed to advertise prefix A, and that AS2 and AS3 have received this advertisement from AS1. Subsequently, if AS2 advertises this path to AS4, it will create a BGP advertisement transaction listing AS1 as the input and AS4 as the output. However, if AS4 were to advertise this AS path in BGP as AS4-AS1-IP Prefix A, then its BGP peers can easily verify that AS4 is not capable of sending packets to IP prefix A via AS1, since the advertisement transaction by AS1 only lists AS2 and AS3 (not AS4) as recipients of the prefix A.

Figure 6A:
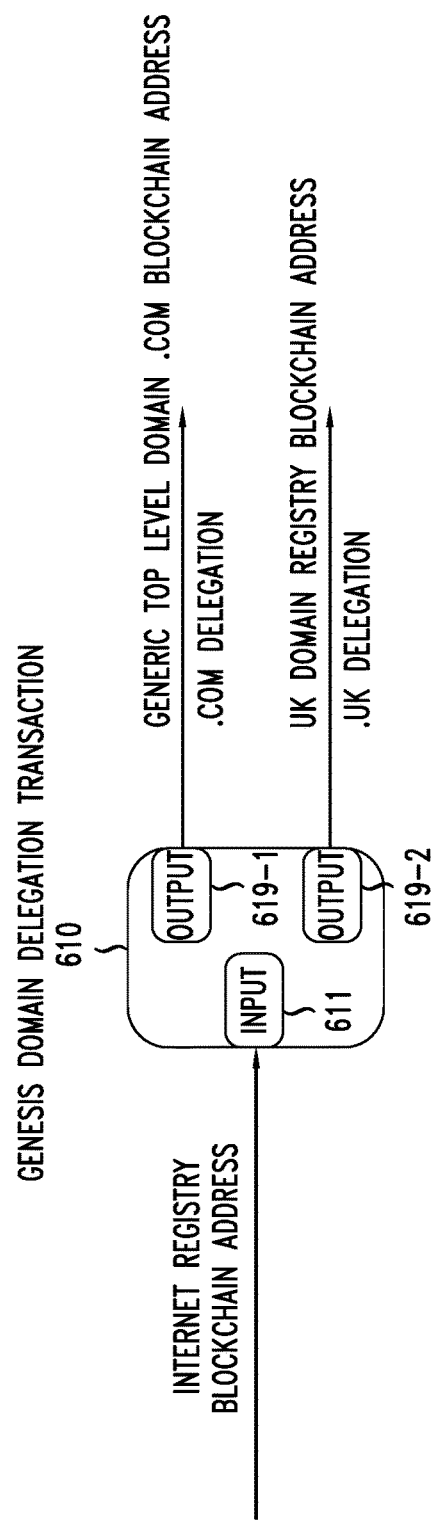
FIGS. 6A and 6B depict exemplary Internet resource transactions for domain names.
Figure 6B:
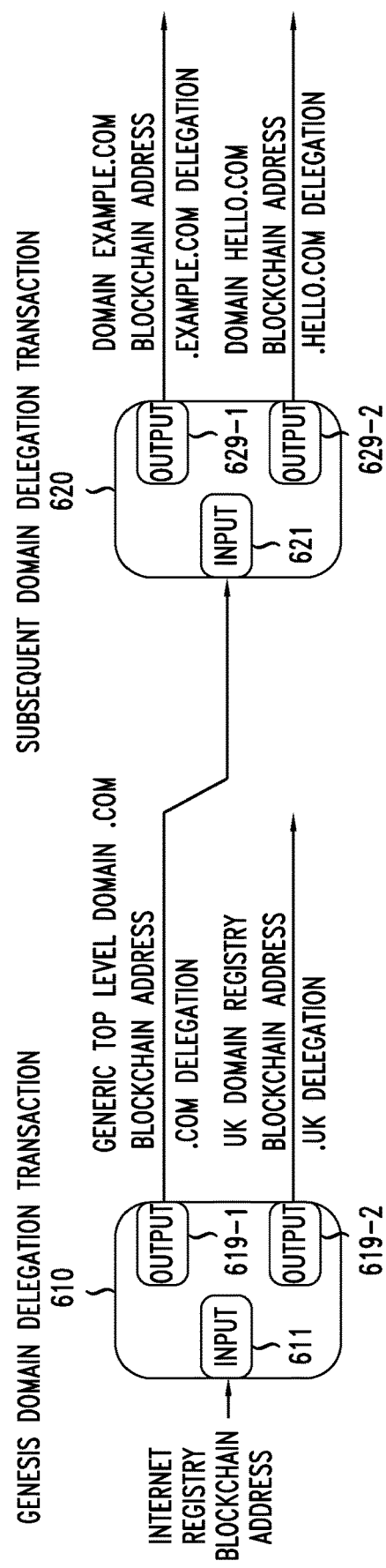

FIGS. 6A and 6B depict exemplary Internet resource transactions for domain names.

FIG. 6A depicts a genesis domain delegation transaction 610 for a set of Internet domains (illustratively, the .com and .uk domains) in which an Internet registry delegates the .com domain to a Generic Top Level Domain registry (represented by the Generic Top Level Domain .com blockchain address) and delegates the .uk domain to a regional Internet registry for the United Kingdom (represented by the UK domain registry blockchain address). As depicted in FIG. 6A, the genesis domain delegation transaction 610 includes (1) an input 611 identifying the source Internet registry by its Internet Registry blockchain address and (2a) a first output 619-1 identifying the Generic Top Level Domain registry by its Generic Top Level Domain .com blockchain address and also including an indication that use of the .com domain has been delegated to the Generic Top Level Domain registry and (2b) a second output 619-1 identifying the Generic Top Level Domain registry by its Generic Top Level Domain .com blockchain address and also including an indication that use of the .com domain has been delegated to the Generic Top Level Domain registry.

FIG. 6B depicts the genesis domain delegation transaction 610 of FIG. 6A as well as a subsequent domain delegation transaction 620 for the .com domain which was allocated to the Generic Top Level Domain registry in the genesis domain delegation transaction 610. As depicted in FIG. 6B, the Generic Top Level Domain registry which received delegation of the .com domain in the genesis domain delegation transaction 610 of FIG. 6A may then further delegate use of the .com domain to Internet participants operating domains within the .com domain (illustratively, the .example.com domain and the .hello.com domain). More specifically, as depicted in FIG. 6B, the subsequent domain delegation transaction 620 for the .com domain includes (1) an input 621 identifying the Generic Top Level Domain registry by its Generic Top Level Domain .com blockchain address (i.e., referencing the output 619-1 of the genesis domain delegation transaction 610) and (2a) a first output 629-1 identifying the domain example.com by its Internet blockchain address and also including an indication that use of the .example.com domain has been delegated to the Internet participant indicated by the domain example.com blockchain address and (2b) a second output 629-2 identifying the domain hello.com by its Internet blockchain address and also including an indication that use of the .hello.com domain has been delegated to the Internet participant indicated by the domain hello.com blockchain address.

It is noted that the domain delegation transactions of FIGS. 6A and 6B, as well as other domain delegation transactions that become part of the Internet blockchain, enable various Internet participants to accurately and reliably map domain ownership, including verifying whether a particular Internet participant is authorized to delegate a given DNS domain.

It will be appreciated that various modifications of and extensions to use of the Internet blockchain as discussed above may be supported for various types of Internet resources and the associated Internet resource transactions for those Internet resources.

In general, in the current Internet, resources are not owned, but, rather, are leased. For example, Internet resources such as addresses and domain names typically are only owned for a period of time on payment of a specified sum, and can be renewed by continued payments; however, if the payments stop, or if the owner becomes inactive, the Internet resources are reclaimed. In at least some embodiments, in order to support leasing of Internet resources, the generation of an Internet resource transaction for a lease of an Internet resource also results in generation of an associated reverse Internet resource transaction. The Internet resource transaction is for an allocation of the Internet resource from a first Internet participant to a second Internet participant, and the lease of the Internet resource has a lease expiry associated therewith. The reverse Internet resource transaction is for an allocation of the Internet resource from the second Internet participant back to the first Internet participant. The reverse Internet resource transaction is configured to take effect at or after the lease expiry of the lease of the Internet resource as indicated in the Internet resource transaction (which may or may not occur depending on whether the lease of the Internet resource is renewed prior to the lease expiry, as discussed further below). In at least some embodiments, based on a determination that the lease of the Internet resource is renewed, before the lease expiry of the lease of the Internet resource, to provide thereby a new lease of the Internet resource having a new lease expiry associated therewith, a new reverse Internet resource transaction is generated for the Internet resource, where the new reverse Internet resource transaction indicates an allocation of the Internet resource from the second Internet participant to the first Internet participant and where the new reverse Internet resource transaction is configured to take effect at or after the new lease expiry of the new lease of the Internet resource. In at least some such embodiments, in order to ensure that the new reverse Internet resource transaction takes precedence over the reverse Internet resource transaction, the new reverse Internet resource transaction may be assigned a sequence number that is greater than a sequence number previously assigned to the reverse Internet resource transaction. In at least some embodiments, based on a determination that the lease of the Internet resource is not renewed before the lease expiry of the lease of the Internet resource, broadcast the reverse Internet resource transaction via the peer-to-peer system.

In general, as discussed above, in the current Internet, resources are not owned, but, rather, are leased. While it is generally expected that a lease of an Internet resource may be transferred between Internet participants (e.g., a registry can reclaim unused Internet resources from one Internet participant and allocate the reclaimed Internet resources to another Internet participant), this is not always the case (e.g., in many countries, it is not possible to transfer IP addresses between ISPs without regulatory approval, although it is usually possible to transfer a DNS name between enterprises). In at least some embodiments, in order to handle these and other types of restricted Internet resource transactions, an Internet resource transaction may include a TRANSFER tag which indicates whether the Internet resource of the Internet resource transaction can be transferred between Internet participants. In at least some such embodiments, the TRANSFER TAG may be used as follows: (1) based on a determination that the TRANSFER tag of an Internet resource transaction for an Internet resource is set (or is set to a first value), then the Internet resource of the Internet resource transaction may be transferred between Internet participants and (2) based on a determination that the TRANSFER tag of an Internet resource transaction for an Internet resource is not set (or is set to a second value), then the Internet resource of the Internet resource transaction cannot be transferred between Internet participants, but, rather, may only be restored to the original owner.

As discussed herein, various functions may be performed by peers and miners for verifying Internet resource transactions and, thus, securing Internet resources of the Internet resource transactions.

Figure 7:
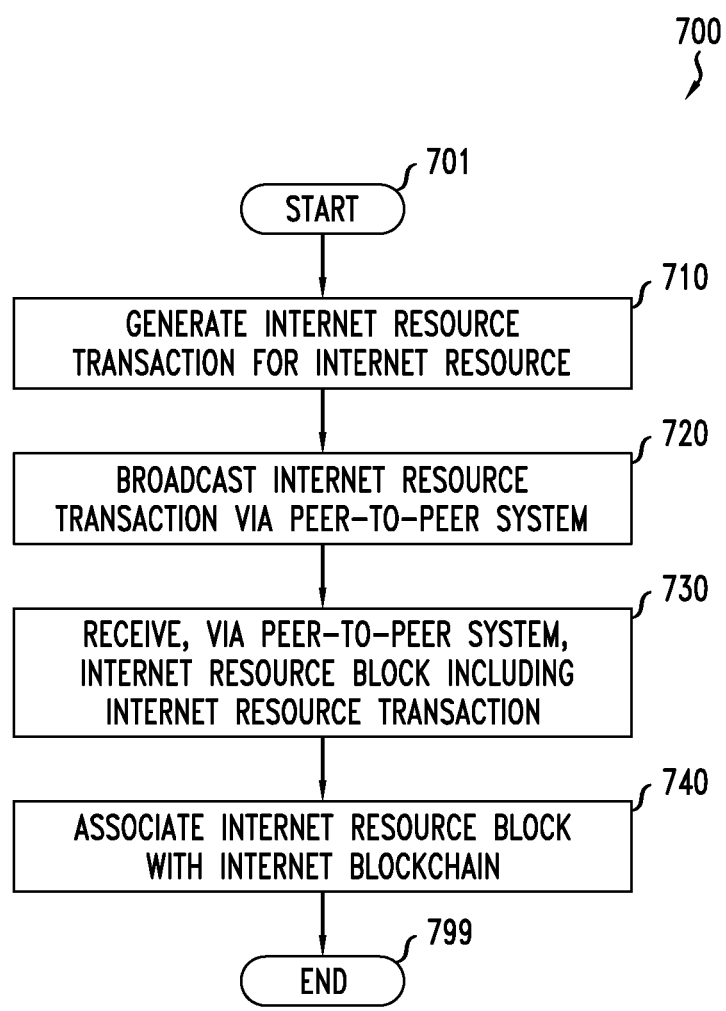
FIG. 7 depicts an exemplary embodiment of a method for use by a peer in a peer-to-peer system employing an Internet blockchain.

FIG. 7 depicts an exemplary embodiment of a method for use by a peer in a peer-to-peer system employing an Internet blockchain. It will be appreciated that, although primarily presented herein as being performed serially, at least a portion of the functions of method 700 may be performed contemporaneously or in a different order than as presented in FIG. 7.

At block 701, the method 700 begins.

At block 710, an Internet resource transaction for an Internet resource is generated by the peer. The Internet resource transaction indicates an allocation of the Internet resource from a first Internet participant to a second Internet participant. The Internet resource transaction may be a genesis transaction or a subsequent transaction. The Internet resource transaction includes a transaction input and a transaction output. The transaction input of the Internet resource transaction is configured to enable a miner to verify the Internet resource transaction (i.e., to verify that the first Internet participant is authorized to allocate the Internet resource). The transaction input may include a reference to a previous Internet resource transaction for the Internet resource (which identifies the first Internet participant, e.g., using the Internet blockchain address of the first Internet participant) and a digital signature based on the private key of the first Internet participant. The transaction output of the Internet resource transaction identifies the second Internet participant.

At block 720, the Internet resource transaction is broadcasted by the peer via the peer-to-peer system. The Internet resource transaction is broadcasted by the peer via the peer-to-peer system in order to enable the Internet resource transaction to be verified by one or more miners of the peer-to-peer system.

At block 730, an Internet resource block including the Internet resource transaction is received by the peer via the peer-to-peer system. The inclusion of the Internet resource transaction in the Internet resource block indicates that the Internet resource transaction has been verified by one or more miners of the peer-to-peer system.

At block 740, the Internet resource block is associated with an Internet blockchain by the peer. The Internet resource block becomes part of the Internet blockchain and, thus, the Internet resource transaction becomes a valid Internet resource transaction.

At block 799, the method 700 ends.

It will be appreciated that, although method 700 is primarily presented with respect embodiments in which the Internet resource transaction indicates an allocation of one Internet resource from a first Internet participant to a second Internet participant, the Internet resource transaction may indicate an allocation of one or more Internet resources from one or more source Internet participants to one or more recipient Internet participants.

Figure 8:
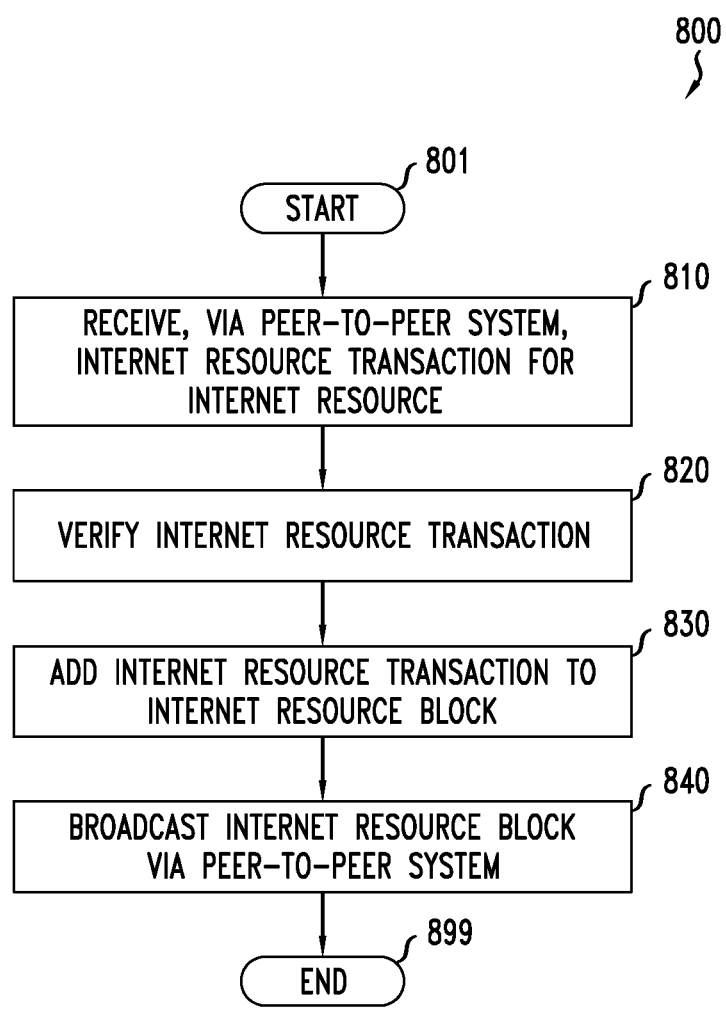
FIG. 8 depicts an exemplary embodiment of a method for use by a miner in a peer-to-peer system employing an Internet blockchain.

FIG. 8 depicts an exemplary embodiment of a method for use by a miner in a peer-to-peer system employing an Internet blockchain. It will be appreciated that, although primarily presented herein as being performed serially, at least a portion of the functions of method 800 may be performed contemporaneously or in a different order than as presented in FIG. 8.

At block 801, the method 800 begins.

At block 810, an Internet resource transaction for an Internet resource is received by the miner via the peer-to-peer system. The Internet resource transaction indicates an allocation of the Internet resource from a first Internet participant to a second Internet participant. The Internet resource transaction may be a genesis transaction or a subsequent transaction. The Internet resource transaction includes a transaction input and a transaction output. The transaction input of the Internet resource transaction is configured to enable a miner to verify the Internet resource transaction (i.e., to verify that the first Internet participant is authorized to allocate the Internet resource). The transaction input may include a reference to a previous Internet resource transaction for the Internet resource (which identifies the first Internet participant) and a digital signature based on the private key of the first Internet participant. The transaction output of the Internet resource transaction identifies the second Internet participant.

At block 820, the Internet resource transaction for the Internet resource is verified by the miner. The miner may verify the Internet resource transaction for the Internet resource by verifying that the first Internet participant is authorized to allocate the Internet resource. The miner may verify the Internet resource transaction for the Internet resource by evaluating the transaction input of the Internet resource transaction to ensure that the transaction input of the Internet resource transaction points to the transaction output of a valid Internet resource transaction of the Internet blockchain. The miner may evaluate the transaction input of the Internet resource transaction, to ensure that the transaction input of the Internet resource transaction points to the transaction output of a valid Internet resource transaction of the Internet blockchain, by verifying that the private key of the source of the Internet resource transaction that is specified in the transaction input of the Internet resource transaction corresponds to the public key of the source of the Internet resource transaction in the transaction output of a valid Internet resource transaction of the Internet blockchain. The miner may verify the Internet resource transaction by determining the public key of the first Internet participant from the previous Internet resource transaction for the Internet resource (e.g., the Internet blockchain address where the public key is used as the Internet blockchain address or recovering the public key from the Internet blockchain address is a shortened form of the public key) and verifying that the private key used for the digital signature in the transaction input of the Internet resource transaction corresponds to the public key of the first Internet participant from the previous Internet resource transaction. It is noted that, for purposes of clarity, it is assumed that the Internet resource transaction for the Internet resource is verified; however, if the miner cannot verify the Internet resource transaction for the Internet resource then the Internet resource transaction for the Internet resource is not added to an Internet resource block intended for inclusion in the Internet blockchain (and, thus, is not broadcasted by the miner via the peer-to-peer system).

At block 830, the Internet resource transaction is added to an Internet resource block by the miner.

At block 840, the Internet resource block is broadcasted by the miner via the peer-to-peer system.

At block 899, the method 800 ends.

It will be appreciated that, although method 800 is primarily presented with respect embodiments in which the Internet resource transaction indicates an allocation of one Internet resource from a first Internet participant to a second Internet participant, the Internet resource transaction may indicate an allocation of one or more Internet resources from one or more source Internet participants to one or more recipient Internet participants.

It will be appreciated that various embodiments of the Internet security mechanism may be configured to provide various improvements over Internet security mechanisms such as the Resource Public Key Infrastructure (RPKI), DNSSec, BGPSec, and the like. For example, various embodiments of the Internet security mechanism may be resistant to forged signatures by entities at or near the top of the Internet resource allocation hierarchy (e.g., central authorities, top-level IRs, RIRs, or the like) that provide digital certificates such as DNSSec digital certificates, BGPSec digital certificates, or the like). For example, various embodiments of the Internet security mechanism may secure BGP advertisements without making the BGP Update message larger by the addition of various signature fields of each AS in the AS path. For example, various embodiments of the Internet security mechanism may be configured to secure BGP advertisements along the entire AS path (as opposed to BGPSec which relies on end-to-end BGPSec support by all ASes in the AS path (which is generally not the case). Various other improvements or potential advantages of the Internet security mechanism are contemplated.

It will be appreciated that, although primarily presented herein with respect to embodiments in which a single Internet blockchain is used to secure multiple types of Internet resources (namely, IP addresses, AS numbers, IP prefixes, domains, and or the like), in at least some embodiments multiple Internet blockchains may be used to secure multiple types of Internet resources. In at least some embodiments, for example, two Internet blockchains may be used to secure the two principal Internet namespaces (e.g., a first Internet blockchain to secure the IP address spaces such as IP addresses, IP prefixes, AS numbers, or the like; and a second Internet blockchain to secure the domain name hierarchy. In at least some embodiments, for example, multiple Internet blockchains may be used to secure the multiple types of Internet resources (e.g., a first Internet blockchain to secure IP addresses, a second Internet blockchain to secure AS numbers, a third Internet blockchain to secure IP prefixes, a fourth Internet blockchain to secure domains, or the like). It will be appreciated that other numbers and arrangements of Internet blockchains are contemplated.

It will be appreciated that, although primarily presented herein with respect to use of the Internet blockchain to secure Internet resources of the Internet, similar blockchains may be used to secure communication network resources of communication networks at various other scales (e.g., by a country to secure Internet resources of the country, by an enterprise to secure communication resources of the enterprise, by an organization to secure communication resources of the organization, or the like). In at least some such embodiments, various references herein to the "Internet" may be read more generally as being references to a "communication network" (e.g., the term "Internet blockchain" may be read more generally as "communication network blockchain" or "network blockchain" and so forth).

Figure 9:
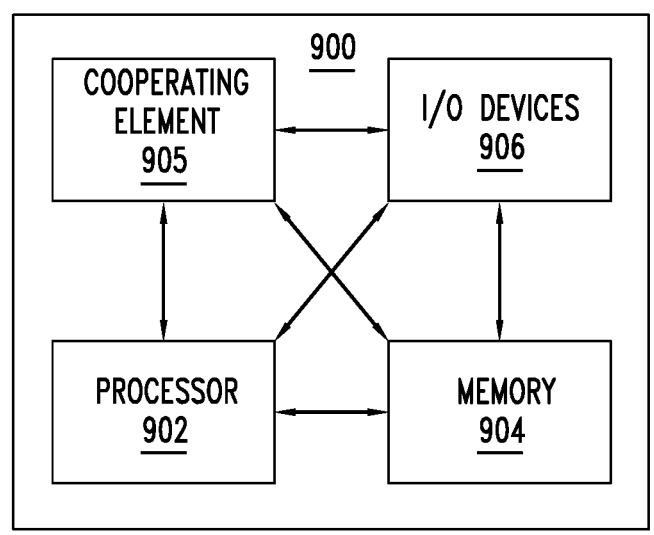
FIG. 9 depicts a high-level block diagram of a computer suitable for use in performing various functions described herein.

FIG. 9 depicts a high-level block diagram of a computer suitable for use in performing various functions described herein.

The computer 900 includes a processor 902 (e.g., a central processing unit (CPU), a processor having a set of processor cores, a processor core of a processor, or the like) and a memory 904 (e.g., a random access memory (RAM), a read only memory (ROM), or the like). The processor 902 and the memory 904 are communicatively connected.

The computer 900 also may include a cooperating element 905. The cooperating element 905 may be a hardware device. The cooperating element 905 may be a process that can be loaded into the memory 904 and executed by the processor 902 to implement functions as discussed herein (in which case, for example, the cooperating element 905 (including associated data structures) can be stored on a non-transitory computer-readable storage medium, such as a storage device or other storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 of FIG. 9 may represent a general architecture and functionality suitable for implementing functional elements described herein, portions of functional elements described herein, or the like, as well as various combinations thereof. For example, computer 900 may provide a general architecture and functionality that is suitable for implementing one or more of an IRD 112, a device 122, an end device 199, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing a set of instructions;
   wherein the set of instructions is configured to, when executed by the at least one processor, cause the apparatus to:
      generate, based on a determination by a first autonomous system to send a Border Gateway Protocol (BGP) update message to a second autonomous system, an Internet resource transaction for an Internet Protocol (IP) prefix, wherein the Internet resource transaction is indicative of an authorization by the first autonomous system for advertisement of the IP prefix by the second autonomous system;
      broadcast, using a peer-to-peer system, the Internet resource transaction;
      receive, using the peer-to-peer system, an Internet resource block including the Internet resource transaction; and
      associate the Internet resource block with an Internet blockchain.

2. The apparatus of claim 1, wherein the Internet resource transaction comprises a transaction input comprising a reference to a previous Internet resource transaction for the IP prefix and a digital signature based on a private key of the first autonomous system, wherein the Internet resource transaction comprises a transaction output comprising a public key of the second autonomous system or a shortened version of the public key of the second autonomous system.

3. The apparatus of claim 1, wherein the Internet resource transaction comprises a transaction input comprising a reference to a previous Internet resource transaction for the IP prefix that identifies an Internet blockchain address of the first autonomous system and a verification of the Internet blockchain address of the first autonomous system, wherein the Internet resource transaction comprises a transaction output comprising an Internet blockchain address of the second autonomous system.

4. The apparatus of claim 1, wherein the Internet resource transaction is indicative of an authorization by the first autonomous system for advertisement of the IP prefix by a third autonomous system.

5. The apparatus of claim 1, wherein the determination to send the BGP update message includes a determination to advertise an AS-Path in the BGP update message.

6. The apparatus of claim 1, wherein the Internet resource transaction is for a lease of the IP prefix, wherein the lease of the IP prefix has a lease expiry associated therewith, wherein the set of instructions is configured to, when executed by the at least one processor, cause the apparatus to:
   generate a reverse Internet resource transaction for the IP prefix, the reverse Internet resource transaction indicating a removal of the authorization by the first autonomous system for advertisement of the IP prefix by the second autonomous system, the reverse Internet resource transaction configured to take effect at or after the lease expiry of the lease of the IP prefix.

7. The apparatus of claim 6, wherein the set of instructions is configured to, when executed by the at least one processor, cause the apparatus to:
   based on a determination that the lease of the IP prefix is renewed, before the lease expiry of the lease of the IP prefix, to provide thereby a new lease of the IP prefix having a new lease expiry associated therewith:
      generate a new reverse Internet resource transaction for the IP prefix, the new reverse Internet resource transaction indicating a removal of the authorization by the first autonomous system for advertisement of the IP prefix by the second autonomous system, the new reverse Internet resource transaction configured to take effect at or after the new lease expiry of the new lease of the IP prefix.

8. The apparatus of claim 7, wherein the reverse Internet resource transaction has associated therewith a first sequence number, wherein the new reverse Internet resource transaction has associated therewith a second sequence number greater than the first sequence number.

9. The apparatus of claim 6, wherein the set of instructions is configured to, when executed by the at least one processor, cause the apparatus to:
   based on a determination that the lease of the IP prefix is not renewed before the lease expiry of the lease of the IP prefix, broadcast the reverse Internet resource transaction using the peer-to-peer system.

10. The apparatus of claim 1, wherein the Internet resource transaction includes a transfer tag, wherein the set of instructions is configured to, when executed by the at least one processor, cause the apparatus to:
set the transfer tag of the Internet resource transaction to a first state to indicate that a further advertising of the IP prefix by the second autonomous system is permitted or set the transfer tag of the Internet resource transaction to a second state to indicate that a further advertising of the IP prefix by the second autonomous system is not permitted.

11. A method, comprising:
generating, based on a determination by a first autonomous system to send a Border Gateway Protocol (BGP) update message to a second autonomous system, an Internet resource transaction for an Internet Protocol (IP) prefix, wherein the Internet resource transaction is indicative of an authorization by the first autonomous system for advertisement of the IP prefix by the second autonomous system;
broadcasting, using a peer-to-peer system, the Internet resource transaction;
receiving, using the peer-to-peer system, an Internet resource block including the Internet resource transaction; and
associating the Internet resource block with an Internet blockchain.

12. The method of claim 11, wherein the Internet resource transaction comprises a transaction input comprising a reference to a previous Internet resource transaction for the IP prefix and a digital signature based on a private key of the first autonomous system, wherein the Internet resource transaction comprises a transaction output comprising a public key of the second autonomous system or a shortened version of the public key of the second autonomous system.

13. The method of claim 11, wherein the Internet resource transaction comprises a transaction input comprising a reference to a previous Internet resource transaction for the IP prefix that identifies an Internet blockchain address of the first autonomous system and a verification of the Internet blockchain address of the first autonomous system, wherein the Internet resource transaction comprises a transaction output comprising an Internet blockchain address of the second autonomous system.

14. The method of claim 11, wherein the Internet resource transaction is indicative of an authorization by the first autonomous system for advertisement of the IP prefix by a third autonomous system.

15. The method of claim 11, wherein the determination to send the BGP update message includes a determination to advertise an AS-Path in the BGP update message.

16. The method of claim 11, wherein the Internet resource transaction is for a lease of the IP prefix, wherein the lease of the IP prefix has a lease expiry associated therewith, wherein the method further includes:
generating a reverse Internet resource transaction for the IP prefix, the reverse Internet resource transaction indicating a removal of the authorization by the first autonomous system for advertisement of the IP prefix by the second autonomous system, the reverse Internet resource transaction configured to take effect at or after the lease expiry of the lease of the IP prefix.

17. The method of claim 16, further including:
based on a determination that the lease of the IP prefix is renewed, before the lease expiry of the lease of the IP prefix, to provide thereby a new lease of the IP prefix having a new lease expiry associated therewith:
generating a new reverse Internet resource transaction for the IP prefix, the new reverse Internet resource transaction indicating a removal of the authorization by the first autonomous system for advertisement of the IP prefix by the second autonomous system, the new reverse Internet resource transaction configured to take effect at or after the new lease expiry of the new lease of the IP prefix.

18. The method of claim 16, further comprising:
based on a determination that the lease of the IP prefix is not renewed before the lease expiry of the lease of the IP prefix, broadcasting the reverse Internet resource transaction using the peer-to-peer system.

19. The method of claim 11, wherein the Internet resource transaction includes a transfer tag, wherein the method further includes:
setting the transfer tag of the Internet resource transaction to a first state to indicate that a further advertising of the IP prefix by the second autonomous system is permitted or set the transfer tag of the Internet resource transaction to a second state to indicate that a further advertising of the IP prefix by the second autonomous system is not permitted.

20. An apparatus, comprising:
at least one processor; and
at least one memory storing a set of instructions;
wherein the set of instructions is configured to, when executed by the at least one processor, cause the apparatus to:
receive, using a peer-to-peer system, an Internet resource transaction for an Internet Protocol (IP) prefix, wherein the Internet resource transaction is indicative of an authorization by a first autonomous system for advertisement of the IP prefix by a second autonomous system;
verify the Internet resource transaction for the IP prefix;
add the Internet resource transaction to an Internet resource block based on verification of the Internet resource transaction for the IP prefix; and
broadcast the Internet resource block using the peer-to-peer system.

* * * * *